UNITED STATES PATENT OFFICE.

OTTO H. KRAUSE, OF JERSEY CITY, ASSIGNOR TO EDWARD E. QUIMBY, OF ORANGE, NEW JERSEY.

IMPROVEMENT IN METHODS OF COLORING SUGAR.

Specification forming part of Letters Patent No. 222,508, dated December 9, 1879; application filed July 21, 1879.

*To all whom it may concern:*

Be it known that I, OTTO H. KRAUSE, of Jersey city, New Jersey, have invented an Improved Method of Coloring Sugar, of which the following is a specification.

The coloring of soft sugar to dispel its yellow tint is usually effected by treating the sugar with a coloring-fluid consisting of a dilute aqueous mixture of ultramarine, which is forced by centrifugal action through the sugar while the latter is contained in the centrifugal machine. When this is done the sirup discharged from the sugar is discolored by admixture with the excess of coloring-fluid which is discharged with it, and it is hence necessary to remove the coloring-matter from the sirup by a subsequent operation. The coloring-fluid also dissolves and carries off a portion of the sugar.

By my invention I seek, first, to limit the quantity of coloring-matter employed to the exact amount which is required to effect the desired lightening in color of the sugar; and, secondly, to avoid the admixture of coloring-matter with the sirup; and, thirdly, to prevent the loss of the sugar ordinarily dissolved and carried off by the coloring-fluid.

In carrying out my invention I defer the process of coloring until after the sugar has been drained and discharged from the centrifugal machine.

In order to effect the uniform distribution throughout the mass of sugar to be whitened of the exceedingly small percentage of coloring-matter required, I first thoroughly mix my coloring-matter with a comparatively small quantity of, preferably, dry powdered sugar, and then use the highly-colored sugar which I thus obtain for mixing with the sugar to be whitened. For example, I mix one pound of violet ultramarine, in the condition, preferably, of a dry powder, with twelve pounds of powdered sugar, and thus obtain thirteen pounds of highly-colored sugar, which is sufficient to whiten from twenty to thirty thousand pounds of soft sugar, according to the original color of the sugar to be treated.

It will, of course, be understood that the thirteen pounds of highly-colored sugar may be mixed with an additional quantity of sugar, for the purpose of increasing the bulk of the coloring-agent which is to be used to whiten the mass of sugar to be treated; but, ordinarily, I find no difficulty in effecting the uniform admixture of thirteen pounds of highly-colored dry sugar with thirty thousand pounds of sugar.

The highly-colored sugar may be prepared by mixing twelve pounds of sugar with a concentrated aqueous mixture containing one pound of coloring-matter, and then drying the product; or one pound of dry coloring-matter may be easily mixed with twelve pounds of dry sugar by hand, or by any of the well-known forms of sugar-mixing mechanism ordinarily used for mixing different grades of sugar; and the same thing is true of mixing the highly-colored sugar with the larger quantity of sugar to be treated.

By thus conducting the coloring-process by a series of steps I am enabled to effect the uniform diffusion of one pound of coloring-matter throughout a mass of sugar weighing thirty thousand pounds.

What I claim as my invention, and desire to secure by Letters Patent of the United States, is—

The method of coloring sugar herein described, which consists in first mixing an excess of coloring-matter with a suitable quantity of powdered sugar, which is thus uniformly and highly colored, and in then mixing this highly-colored sugar, when dry, in any required proportions, with the larger quantity of sugar to be treated, substantially as described.

O. H. KRAUSE.

Witnesses:
M. L. ADAMS,
EDWD. PAYSON.